T. PARKER.
METHOD OF MAKING BRICKS.
APPLICATION FILED NOV. 21, 1914.
1,183,760.
Patented May 16, 1916.
2 SHEETS—SHEET 1.
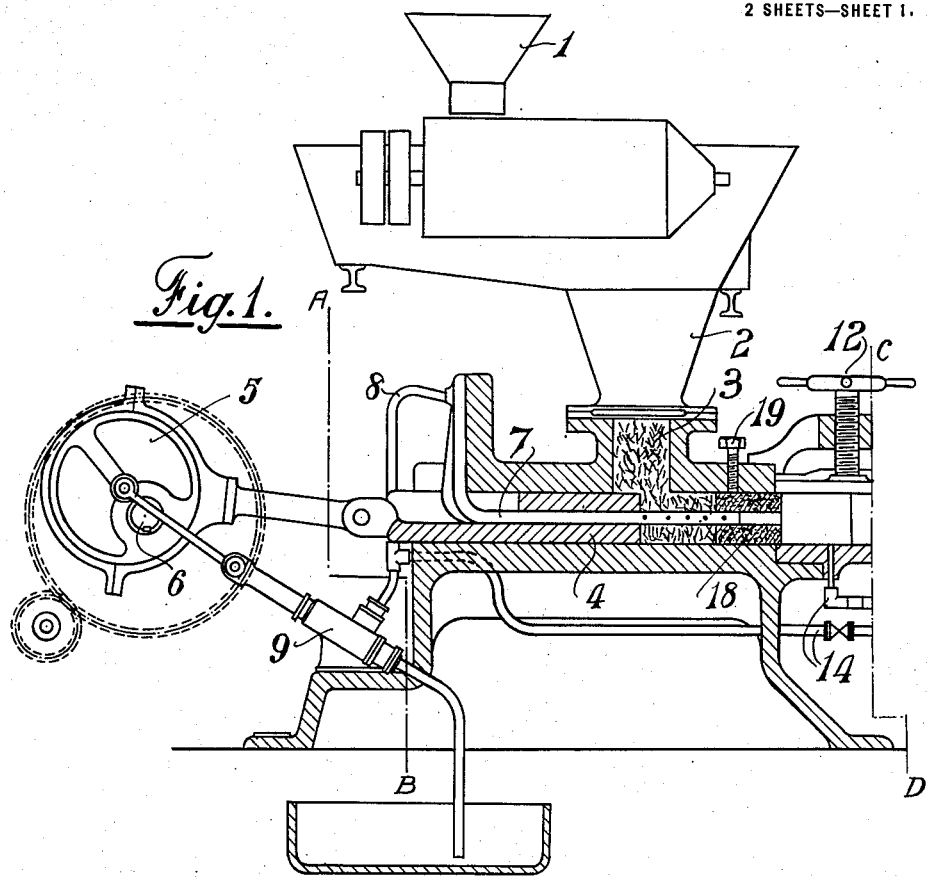
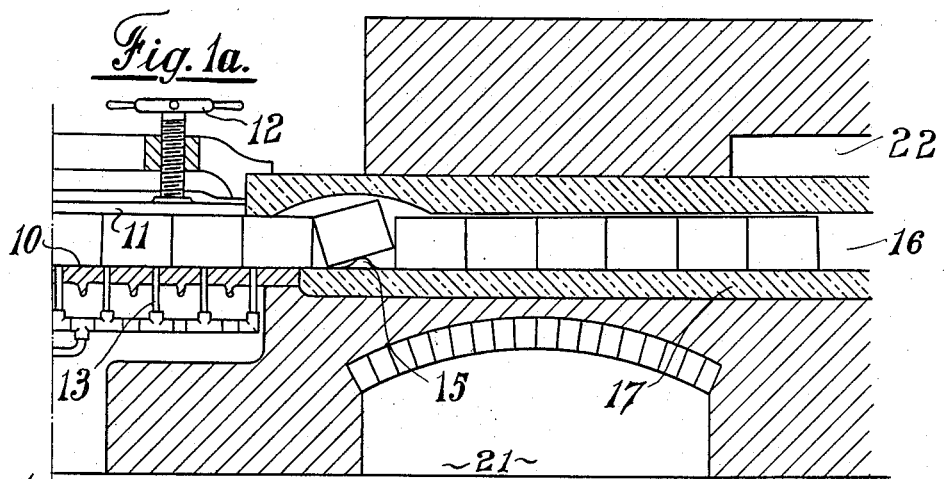
Witnesses:
Inventor:
Thomas Parker
by B. Singer Atty

UNITED STATES PATENT OFFICE.

THOMAS PARKER, OF LONDON, ENGLAND.

METHOD OF MAKING BRICKS.

1,183,760.  Specification of Letters Patent.  Patented May 16, 1916.

Application filed November 21, 1914. Serial No. 873,304.

*To all whom it may concern:*

Be it known that I, THOMAS PARKER, a subject of the King of Great Britain and Ireland, and a resident of London, England, have invented certain new and useful Improvements in the Method of Making Bricks, of which the following is a specification.

This invention relates to a new or improved method of molding and finishing bricks, building materials and the like, and has for its object to produce by means of the improvements hereinafter described, perfectly finished bricks, tiles, pipes, or the like molded articles that are required in the building or like art of any required consistency, hardness and coloring, the process of production being continuous from the delivery of the raw material to the finished article, such process embracing in its entirety, molding, coloring, vitrifying or glazing, burning and delivering the articles cooled off for storage or transport.

The invention in its essentials is characterized by the molding of the brick earth or raw material in a dry or comparatively dry and comminuted condition against the back of the last formed article at a pressure that knits the particles together to form a homogeneous article, such series of articles when molded successively preserving their form and shape by reason of such preliminary pressing process. The articles so molded are then moistened internally or externally, and from the molding machine fed into a channel or passage that ultimately takes such bricks or articles into a heat zone, where burning or vitrification takes place, and from whence the article is ultimately delivered as a finished product.

In carrying my method into practice an apparatus is used, which comprises a grinding device, a molding press, and a longitudinal chamber, which chamber comprises sections for the various processes entailed in such continuous manufacture referred to.

To more fully describe this invention, reference is made to the accompanying drawings in which:—

Figure 3:
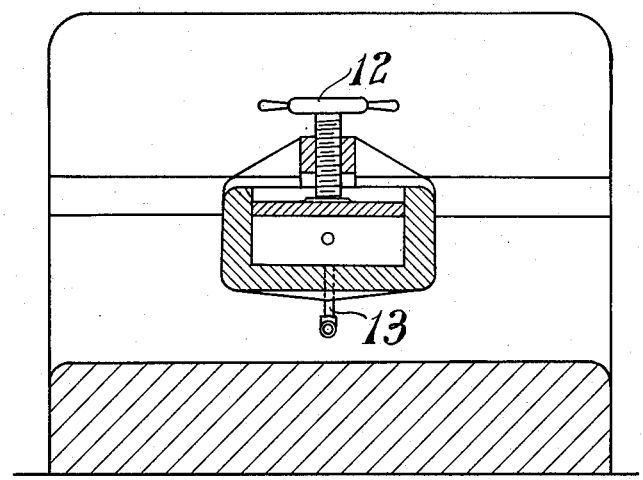
Figure 2:
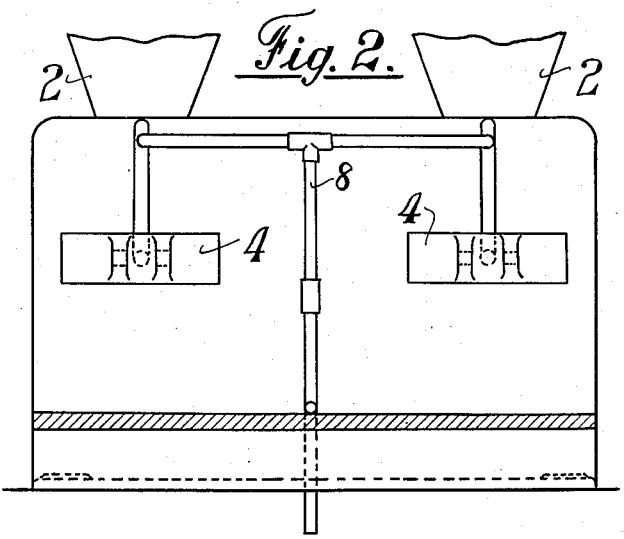

Figure 1 represents in sectional elevation the plant and apparatus for the proposed manufacture. Fig. 1ª is a continuation of Fig. 1, from line C. D. Fig. 2 is an end elevation on line A. B. Fig. 1, and Fig. 3 is a sectional elevation of the press molding box, suitable for the manufacture of a perforated brick.

Referring to the drawings, a grinding machine 1 is placed so that preferably the comminuted raw material may fall by gravity into the delivery chutes 2. This ginding machine may be of known type, but whatever type of grinding machine is employed, it is necessary that the raw material contemplated in the manufacture must be reduced to a highly divided state, and some part of it if not the whole reduced to an impalpable powder. The ground material passing down the chutes 2, enters the mouth 3 of the plunger press section 3ª. This press section is provided with a hollow plunger 4, adapted to be driven in any suitable manner, such as by an eccentric device 5 from a shaft 6.

The hollow plunger 4 is provided with a stationary mandrel 7, which mandrel is adapted to protrude beyond the plunger when the latter is withdrawn. The hollow mandrel is connected by means of a pipe 8 to a boiler pump 9, or similar device by means of which a binding, moistening and coloring agent can be injected through said hollow mandrel into the contents of the brick or like article molded. The plunger press mold section proper terminates a short distance beyond the stroke of the plunger as shown, the diameter of the bore of the section being identical throughout its length. A continuation 10 of the plunger press mold is provided, which may be termed the hand press chamber. This chamber consists of an enveloping shell whose upper part or top plate 11 is adapted to be brought into contact with the molded articles by means of set screws 12. By means of these set screws, the pressure upon the molded articles may be regulated, and the article may be further consolidated. The length of this chamber depends upon the article molded but in the apparatus shown in the drawings, which is suitable for the purpose of molding bricks, the length of the chamber shown, is approximately correct for this purpose. One of the walls of said hand press chamber is provided with an aperture 13 through which a binding agent is forced in any known and convenient manner through the pipe 14. The bricks in this case or articles molded in the press mold that emerge from the hand press chamber, enter a continuing tunnel, that is slightly larger in dimensions than the interior of the hand press chamber, but which is of such dimensions that the articles or bricks so molded cannot turn sidewise and so cause a blockage as the bricks or the like are progressed by the continuously reciprocating movement of the plunger.

It will be observed that in the manufacture of articles according to this process, the preceding article molded, acts as an abutment against which the succeeding article is pressed. It has been stated that when dry or substantially dry material is so treated, adherence between the bricks or articles does not take place, as the surface of the article is, under the pressure employed so smooth, even and hard that the subsequent pressing operation does not cause adherence to take place between successively molded pieces. In order however to break up any attachment that can take place a step or knob 15 is inserted in the path of the bricks prior to their entering the heat zone, the bricks in mounting this step become parted and by reason of their progress detach themselves, and are subsequently fed forward in an independent and loose state. After burning however shrinkage takes place which further assists partition of the molded articles.

The burning chamber 16 is lined with fire brick 17 or equivalent heat resisting material, and is adapted to be heated by means of flues communicating with a furnace (not shown). This chamber 16 continues for some considerable length, sufficient in fact to give the molded articles the duration of one hour or such other necessary time through the heat zone, during which period the critical temperature of vitrification, baking, or of burning takes place, according to the nature of the article to be treated. This process does not differ from known means of effecting the operation of burning or vitrification, and further description therefore of the process is needless. The bricks or other molded articles may on emerging from the heat zone be cooled and this may even be expedited by quenching.

The operation of the invention is as follows: The raw material is fed into the disintegrating or grinding machine 1, and then passes into the delivery mouth of the plunger press mold. At the start of operations an artificial abutment such as at 18 is provided, such as an iron block or the like, which is placed at the position at the end of the plunger stroke. Pressure is brought to bear upon this abutment by means of a set screw 19, and the plunger is driven forward in pressing the material that enters the press mold ultimately driving the abutment and the article molded forward. Simultaneously or shortly after with the formation of the article molded a binding fluid is driven through the hollow mandrel 7 into the interior of the article. Some of this fluid escapes and acts as a lubricating means to assist the passage of the article molded and its previous abutment forward, it assists also to smooth or glaze the external surface. A series of molded artciles are now progressed by a repitition of this operation into the hand press chamber, where further fluid is provided and which the articles molded absorb according to their degree of porosity. As the plunger recedes a partial vacuum is formed inducing the raw material to enter and fill the press mold. The operation of separation and passage through the heat zone take place progressively as they move from end to end of the whole apparatus.

It is preferable in the manufacture of bricks or like articles that the composition of the raw material for this process of molding be composed wholly or mainly of clay, or earth of like character, which in a dry state is capable of fine division, but which when pressed has the faculty of forming a coherent and homogeneous body. A considerable number of adulterants may be used in combination with such clay material. These adulterants may consist of iron ore finely ground, or clays, chalk, brick earth or the like, and the binding agent may also vary. In the case of clay it is only necessary to use steam or water, but should a glaze or vitrification be preferred, then salt water or sodium silicate solution or other known suitable solution may be employed for impregnating the mass to be vitrified. The coloring medium may be intermixed with the fluid glaze, or the desired glaze color may be arrived at by the ingredients from which the articles are molded.

Although one method of carrying this invention into effect has been shown in the drawings, it is obvious that various modifications can be made in the arrangement of the parts, without departing from the spirit of the invention. Further, a series of molds, and press chambers may be common to a single oven, the said oven being divided over that portion of its length which carries the molded articles into a series of fire-clay channels which receive the molded articles and submit them to the heat of the furnace.

Although the present application has been illustrated with the device for making bricks, it is obvious that pipes, conduits, or other similar building materials can be molded by these means, and any required external shape imparted to them according to the contour and formation of the press plunger and press mold. Further in the formation of bricks, or like articles, that have a definite length as compared with their width, the said length or width as the case may be, can be altered, by shortening or lengthening the stroke of the plunger. This can be arranged by increasing or decreasing the throw of the crank shaft 6. Again, in burning or vitrifying the molded articles, the chambers or passages accommodating the said articles may be exposed directly to the flames or hot gas from the flues 21, or the said chamber 16 may be covered in and the said gas arranged to play around it by the provision of annular flues 22, which are disposed to be continuous around the said chamber, over the length of the chamber wherein the raising of the molded article to the critical temperature is carried out. For some articles and if desired fuel in a liquid or dry state may be incorporated in the raw material to be employed. This may be fine coal, saw dust, or the like, and the heat employed may be only sufficient to partly decompose such fuel.

I claim:—

1. A method of making bricks consisting in grinding the raw material, subjecting the same to pressure for successively forming the new bricks against the back of the brick formed before, introducing a binding and coloring agent into the mass while it is subject to pressure, burning and vitrifying the molded article and finally cooling the same.

2. A method of making bricks consisting in grinding the comminuted raw material to a fine powder, subjecting the mass to a preliminary pressure for successively forming the new brick against the end of the brick formed ahead of the same, adding a binder and a coloring agent to the same, moistening the articles, subjecting the same to a final pressure and burning and vitrifying the molded articles, and finally cooling the same.

In testimony whereof I affix my signature in presence of two witnesses.

THOMAS PARKER.

Witnesses:
F. C. HOBS,
H. D. JAMESON.